(12) United States Patent
Nagarajan et al.

(10) Patent No.: US 8,023,150 B2
(45) Date of Patent: *Sep. 20, 2011

(54) METHOD AND SYSTEM FOR IMPROVED COPY QUALITY BY GENERATING CONTONE VALUE BASED ON PIXEL PATTERN AND IMAGE CONTEXT TYPE AROUND PIXEL OF INTEREST

(75) Inventors: Ramesh Nagarajan, Pittsford, NY (US); Francis Kapo Tse, Rochester, NY (US); Chia-Hao Lee, Hacienda Heights, CA (US); John Christopher Cassidy, Fairport, NY (US); John W. Wu, Rancho Palos Verdes, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,233

(22) Filed: Mar. 8, 2010

(65) Prior Publication Data
US 2010/0157374 A1 Jun. 24, 2010

Related U.S. Application Data

(62) Division of application No. 11/272,182, filed on Nov. 10, 2005, now Pat. No. 7,773,254.

(51) Int. Cl.
*H04N 1/405* (2006.01)
*H04N 1/407* (2006.01)
(52) U.S. Cl. ....... 358/2.1; 358/3.06; 358/3.21; 358/3.23
(58) Field of Classification Search .................. 358/1.9, 358/2.1, 3.01, 3.06, 3.08, 3.21, 3.23, 462; 382/173, 176, 205, 224, 229, 237, 254, 261
See application file for complete search history.

(56) References Cited

U.S. PATENT DOCUMENTS

| | | | |
|---|---|---|---|
| 4,958,236 | A | 9/1990 | Nagashima et al. |
| 5,008,950 | A | 4/1991 | Katayama et al. |
| 5,065,255 | A | 11/1991 | Kimura et al. |
| 5,293,430 | A | 3/1994 | Shiau et al. |
| 5,323,232 | A | 6/1994 | Otaka et al. |

(Continued)

FOREIGN PATENT DOCUMENTS

EP 1583064 10/2005

(Continued)

OTHER PUBLICATIONS

An unofficial File History as of Oct. 7, 2010 for US Patent 7,352,490 (U.S. Appl. No. 11/531,572).

(Continued)

*Primary Examiner* — Scott A Rogers
(74) *Attorney, Agent, or Firm* — Michael J. Nickerson; Basch & Nickerson LLP

(57) ABSTRACT

A method and system reconstructs a contone image from a binary image by first tagging pixels to identify one of a multiplicity of image content types. The tag information and the pattern of bits surrounding the pixel to be converted to a contone value are used to reconstruct a contone image from a binary image. The pattern of bits in the neighborhood is used to generate a unique identifier. The unique identifier is used as the address for a lookup table with the contone value to be used wherein each lookup table corresponds to an image context type.

6 Claims, 5 Drawing Sheets

U.S. PATENT DOCUMENTS

| | | | |
|---|---|---|---|
| 5,347,599 | A | 9/1994 | Yamashita et al. |
| 5,572,606 | A | 11/1996 | Tanioka |
| 5,617,216 | A | 4/1997 | Wada |
| 5,617,459 | A | 4/1997 | Makram-Ebeid et al. |
| 5,754,710 | A | 5/1998 | Sekine et al. |
| 5,818,964 | A | 10/1998 | Itoh |
| 5,850,474 | A | 12/1998 | Fan et al. |
| 5,959,290 | A | 9/1999 | Schweid et al. |
| 6,020,979 | A | 2/2000 | Zeck et al. |
| 6,130,966 | A | 10/2000 | Sekine et al. |
| 6,229,578 | B1 | 5/2001 | Acharya et al. |
| 6,240,205 | B1 | 5/2001 | Fan et al. |
| 6,259,823 | B1 | 7/2001 | Lee et al. |
| 6,275,303 | B1 | 8/2001 | Fukaya |
| 6,282,325 | B1 | 8/2001 | Han |
| 6,285,464 | B1 | 9/2001 | Katayama et al. |
| 6,343,159 | B1 | 1/2002 | Cuciurean-Zapan |
| 6,427,030 | B1 | 7/2002 | Williams et al. |
| 6,477,282 | B1 | 11/2002 | Ohtsuki et al. |
| 6,594,401 | B1 | 7/2003 | Metcalfe et al. |
| 6,606,420 | B1 | 8/2003 | Loce et al. |
| 6,608,701 | B1 | 8/2003 | Loce et al. |
| 6,683,702 | B1 | 1/2004 | Loce et al. |
| 6,771,832 | B1 | 8/2004 | Naito et al. |
| 6,873,437 | B1 | 3/2005 | Kuwahara et al. |
| 6,920,252 | B2 | 7/2005 | Rouvellou |
| 6,975,434 | B1 | 12/2005 | Pilu et al. |
| 7,039,232 | B2 | 5/2006 | Nagarajan |
| 7,043,080 | B1 | 5/2006 | Dolan |
| 7,079,289 | B2 | 7/2006 | Loce et al. |
| 7,352,490 | B1 | 4/2008 | Tse et al. |
| 7,372,992 | B2 | 5/2008 | Ohshita |
| 7,440,139 | B2 | 10/2008 | Loce et al. |
| 7,460,276 | B2 | 12/2008 | Xu et al. |
| 7,580,569 | B2 | 8/2009 | Tse et al. |
| 7,773,254 | B2 | 8/2010 | Nagarajan et al. |
| 2002/0126912 | A1 | 9/2002 | Rouvellou |
| 2002/0140983 | A1 | 10/2002 | Shimizu |
| 2002/0159096 | A1 | 10/2002 | Sun et al. |
| 2002/0181797 | A1 | 12/2002 | Young |
| 2002/0191857 | A1 | 12/2002 | Macy |
| 2002/0196467 | A1 | 12/2002 | Delhoune et al. |
| 2003/0007687 | A1 | 1/2003 | Nesterov et al. |
| 2003/0043210 | A1 | 3/2003 | Hanks |
| 2003/0090729 | A1 | 5/2003 | Loce et al. |
| 2003/0091222 | A1 | 5/2003 | Young et al. |
| 2003/0133610 | A1 | 7/2003 | Nagarajan |
| 2003/0193680 | A1 | 10/2003 | Karidi |
| 2004/0066538 | A1 | 4/2004 | Rozzi |
| 2004/0114814 | A1 | 6/2004 | Boliek et al. |
| 2004/0175037 | A1 | 9/2004 | Guleryuz |
| 2005/0163374 | A1 | 7/2005 | Ferman et al. |
| 2005/0206948 | A1 | 9/2005 | Uejo |
| 2005/0259886 | A1 | 11/2005 | Shan |
| 2005/0270582 | A1 | 12/2005 | Hara |
| 2006/0077489 | A1 | 4/2006 | Zhang et al. |
| 2006/0115182 | A1 | 6/2006 | Deng et al. |
| 2006/0132847 | A1 | 6/2006 | Xu et al. |
| 2006/0132850 | A1 | 6/2006 | Banton et al. |
| 2006/0232798 | A1 | 10/2006 | Xu et al. |
| 2006/0257045 | A1 | 11/2006 | McCandlish |
| 2007/0053003 | A1 | 3/2007 | Loce et al. |
| 2007/0103731 | A1 | 5/2007 | Tse et al. |
| 2007/0109602 | A1 | 5/2007 | Tse |
| 2007/0172148 | A1 | 7/2007 | Hawley |
| 2007/0172149 | A1 | 7/2007 | Cuciurean-Zapan |
| 2007/0258101 | A1 | 11/2007 | Nagarajan et al. |
| 2008/0049238 | A1 | 2/2008 | Nagarajan et al. |
| 2010/0046856 | A1* | 2/2010 | Bai et al. ........................ 382/293 |

FOREIGN PATENT DOCUMENTS

| | | |
|---|---|---|
| EP | 1601184 | 11/2005 |
| GB | 2291308 | 1/1996 |
| JP | 09051431 | 2/1997 |
| WO | WO9930547 | 6/1999 |

OTHER PUBLICATIONS

An unofficial File History as of Oct. 7, 2010 for U.S. Appl. No. 12/197,348.

An unofficial Prosecution History as of Aug. 16, 2010 for U.S. Appl. No. 11/126,970.

An unofficial Prosecution History as of Aug. 16, 2010 for U.S. Appl. No. 11/281,267.

An unofficial Prosecution History as of Aug. 16, 2010 for U.S. Appl. No. 11/467,584.

He, Z.; Chang, T.; Allebach, J.; Bouman C.; Boundary Stitching Algorithm for Parallel Implementation of Error Diffusion; Xerox Corporation, provided Nov. 8, 2008.

Farzin Aghdasi and Rahab K. Ward, Reduction of Boundary Artifacts in Image Restoration, IEEE Transactons on Image Processing, vol. 5, No. 4, Apr. 1996, pp. 611-618.

A Machine Translation of Japanese patent publication JP09-051431 a Japanese Office Action dated Nov. 30, 2009 for JPA 2006-128283, Japanese counterpart application of U.S. Appl. No. 11/126,970, JP09-051431 published Feb. 1997.

Unofficial European Search Report dated Feb. 25, 2009 for European Patent Application 06113615.6.

Unofficial European Office Action Dated Oct. 15, 2009 for European Patent Application EP06113615.6 (Corresponding to U.S. Appl. No. 11/126,970).

An unofficial File History, as of Aug. 16, 2010 for US Patent 7,773,254 (U.S. Appl. No. 11/272,182).

An unofficial File History for US Patent 7,580,569 (U.S. Appl. No. 11/268,147), as of Aug. 14, 2009.

* cited by examiner

| 0 | 1 | 2 | 3 |
|---|---|---|---|
| 1 | 2 | 4 | 8 |
| 4 | 5 | 6 | 7 |
| 16 | 32 | 64 | 128 |
| 8 | 9 | 10 | 11 |
| 256 | 512 | 1024 | 2048 |
| 12 | 13 | 14 | 15 |
| 4096 | 8192 | 16384 | 32768 |

METHOD AND SYSTEM FOR IMPROVED COPY QUALITY BY GENERATING CONTONE VALUE BASED ON PIXEL PATTERN AND IMAGE CONTEXT TYPE AROUND PIXEL OF INTEREST

PRIORITY INFORMATION

This application is a divisional application of co-pending U.S. patent application Ser. No. 11/272,182, filed on Nov. 10, 2005. This application claims priority, under 35 U.S.C. §120, from co-pending U.S. patent application Ser. No. 11/272,182, filed on Nov. 10, 2005. The entire content of co-pending U.S. patent application Ser. No. 11/272,182, filed on Nov. 10, 2005 is hereby incorporated by reference.

BACKGROUND AND SUMMARY

Digital multifunction reprographic systems are well known and have replaced optical reprographic systems as a way to reproduce images. In these conventional digital multifunction reprographic systems, a scanner accepts a document to be copied and converts the document into electronic image(s). These images, usually in the form of pages, are then passed to a central control unit which may re-order or reorganize these pages and then, depending on the request of the user of the device, send the pages or images to a destination. Often this destination is an attached printing unit which makes one or more copies of the original document.

However, these conventional devices perform many other functions besides simple copying. The central control unit is usually equipped with a combination of hardware and software elements that enable it to accept input from other sources. The other sources may include some sort of network interface and/or an interface to a telephone system to enable FAX input.

The network interface is usually configured so that it can accept jobs to be printed from any computer source that is connected to the network. This configuration normally includes elements that can convert input documents formatted in one or more page description languages (PDLs) to the native format of the printing device.

An important inner component of such a conventional multifunction digital device is the image path. This is the combination of software and hardware elements that accepts the electronic images from a multiplicity of sources and performs any operations needed to convert the images to the format desired for the various output paths. The image path is usually one of the more complex and costly components of such digital multifunction devices.

The image path for a conventional multifunction device usually has several constraints. One the hand, there is a desire to make the image path utilize data in a multi-bit per pixel format so as to provide for maximum image quality and a minimum loss of critical information in the transformation of documents from paper to electronic form. On the other hand, there are cost constraints and performance limits on the devices or software that comprise the image path.

Conventional image path electronics may also utilize binary image paths. In this situation, if the input information is scanned in a binary manner at sufficiently high resolution, the scanned image can be reconstructed at the output with little or no perceptible loss of image quality.

Another component of many conventional multifunction devices, especially for those devices having a printing engine that is capable of producing colored output, is the use of analog modulation schemes for the output. In these devices, analog data, in the form of multi-bit pixels, is presented to the modulator of the output printing device. The modulator compares the analog equivalent of the input byte of data to a periodic saw tooth wave. The output therefrom is a signal to the laser imaging component that is pulsewidth modulated by the data stream.

One recent development for conventional multifunction reprographic machines is the use of both binary and analog data in the image path. In such a hybrid image path, the data from the scanner is digitized and converted to binary. All of the intermediate elements of the image path are designed to work with the compact binary data format. Only at the output is the data converted to multi-bit analog form.

One way to implement the resolution conversion is to pass the binary data through the digital equivalent of a two-dimensional low pass filter. The low pass filter may replace each pixel in the binary image by the average of the values within some window centered on the pixel of interest. While such a system does an adequate job of converting the high resolution binary data to analog data, these solutions also have the deleterious effect of smearing sharp edges in the original document. Such an effect is particularly detrimental when reproducing text and line art.

A desirable modification to hybrid image paths would be a system wherein the conversion from binary format to analog format could take into account the existence of sharp edges in the image. Ideally, such a system would be adaptive, that is, the system would change its behavior so that it would apply a resolution conversion process appropriate to sharp edges for those parts of the image that have such edges, but use a different process that was better adapted to more continuous tone parts of the image.

Moreover, the resolution conversion process could make further distinctions in the various aspects of the image beyond a simple division into pictorial vs. text and line art. Such distinctions might include distinguishing between low and high frequency halftone content, or between pictorial and graphic arts kinds of images.

Systems that implement resolution conversion processes, like those outlined above, show significant improvement in image quality compared to systems that do not. However, such systems are subject to problems.

One such problem is the need to somehow distinguish those parts of the image that have edges from those parts of the image that do not. Various processes have been proposed to identify such regions and to develop an image parallel to that being reproduced, a tag image that identifies the different characteristics of each part of the image.

Therefore, it is desirable to implement a method of reconstructing a contone image from its halftoned counterpart that is efficient in use of image path resources and at the same time is adaptive to the different characteristics of the underlying image so as to maximize the image quality of the output.

BRIEF DESCRIPTION OF THE DRAWING

The drawings are only for purposes of illustrating various embodiments and are not to be construed as limiting, wherein:

FIG. 3 shows a 4×4 pattern generation kernel matrix;

DETAILED DESCRIPTION

Figure 1:
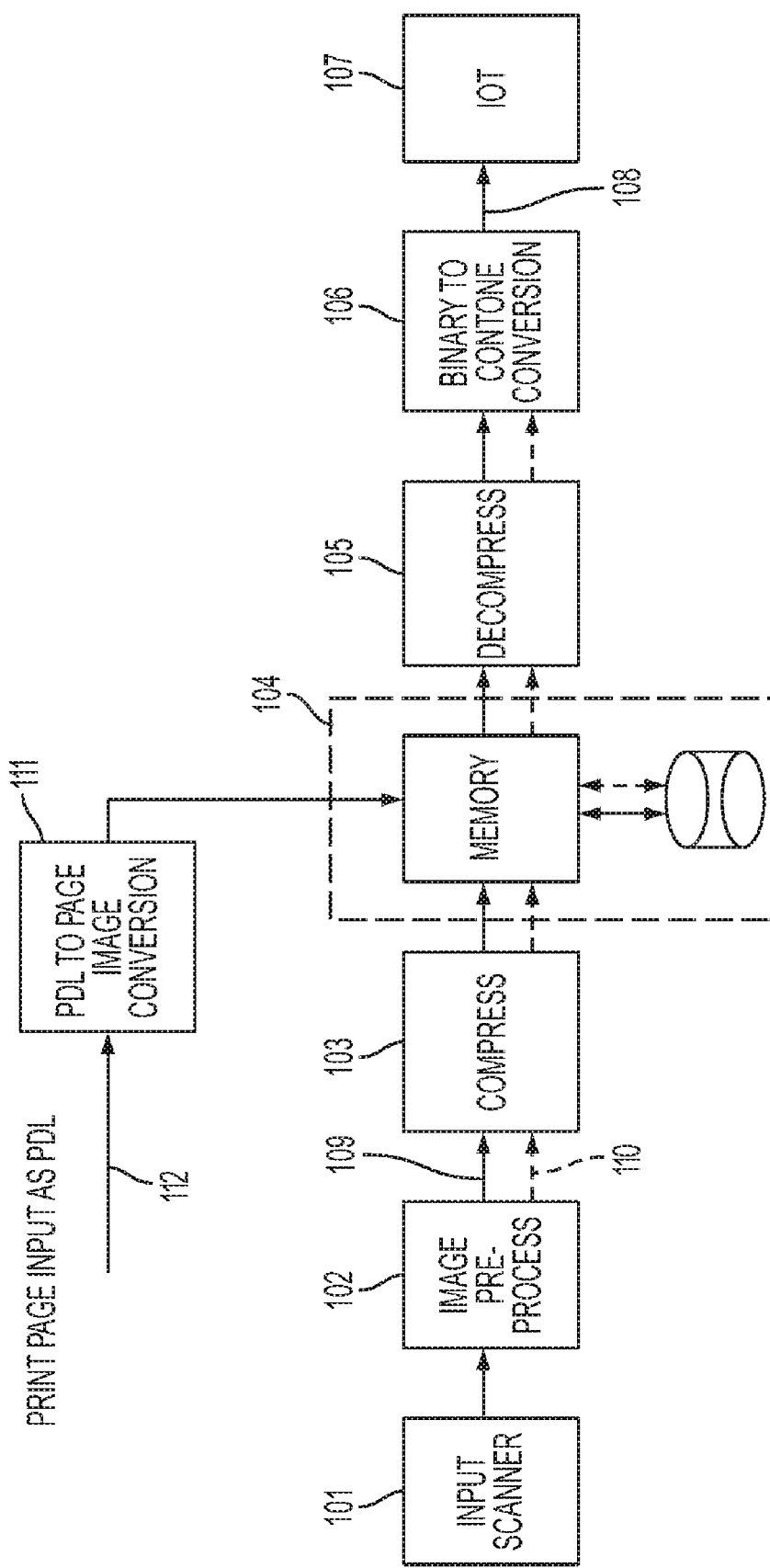
FIG. 1 shows the image path for a conventional multifunction reprographic system.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 shows, in schematic form the general, image path of a multifunction reprographic system. The image path is a combination of hardware and software elements that generate, process, and store the digital page images. A control system (not shown) configures each element of the image path depending on the user job. The control system also schedules the various jobs and functions of the entire system.

As illustrated in FIG. 1, digital scanner 101 accepts a hardcopy version of the page or pages to be copied and converts each page to a digital image, in contone form, at some moderately high resolution. Within the scanner 101, there are usually electronic elements that do some initial processing of the image, correcting, if needed, for any optical or illumination defects in the scanner 101.

The digital page image is then passed to a preprocessor 102 that performs further manipulations of the page image, such as editing, or tone curve correction. The preprocessor 102 converts the contone image from the scanner 101 to a binary image 109. The preprocessor 102 also can form a tag image 110. This tag image 110 can identify, at a pixel level, various characteristics of the underlying page image. For example, the tag image can indicate whether a pixel in the page image is part of a sharp edge or not. Further details of the tag image will be described below.

After the preprocessing, the page and tag images are passed through a compression circuit 103 which losslessly compresses the page and tag images to a smaller size. The compressed images are then passed to a memory 104. The memory 104 stores each page image and its associated tag image, and keeps track of all the relevant sets of images that comprise the document being copied. The memory 104 can be used for many purposes, including for example, the ability to print multiple copies of an input document with a single scan. There are many other functions of the memory 104 that are well known to those skilled in the art.

At the time of marking, the compressed page and tag image in memory are first decompressed using the decompressor circuit 105 and the resultant image and tag are passed to the binary to contone converter 106. The binary to contone converter 106 is conventionally implemented as a two-dimensional digital filter. The filter may be altered by incorporating one or more adaptive elements that are used to enhance edges that are characteristic of text and line art copy. With suitable tagging apparatus upstream, the filter may be switched between one of several modes to adapt to the content of the portion of the image being converted.

More specifically, the binary to contone converter 106 can control the behavior (from a feature/function sense) of the image path. For example, the binary to contone converter 106 may control the behavior of the image path so as to make the image look darker. On the other hand, for example, the binary to contone converter 106 may control the behavior of the image path so as to make the image look sharper.

To realize binary to contone conversion, two parameters are taken into consideration. The first parameter is directed to the pattern of pixels in the neighborhood of the pixel being converted. More specifically, a pattern of pixels in the neighborhood of the pixel being converted is identified. An example of a pattern identifier process is disclosed in U.S. Pat. No. 6,343,159. The entire content of U.S. Pat. No. 6,343,159 is hereby incorporated by reference.

Once the pattern is identified, a pattern identifier dataword is forwarded to a plurality of look-up tables, each look-up table being capable of converting the pattern identifier dataword to a contone value. These look-up tables are correlated to both the image pattern and image content type, thus a second parameter needs to be considered to choose the correct look-up table.

The second parameter is directed to the characterization of the image context in the neighborhood of the pixel being converted. As the document is scanned and converted to binary, each pixel is tagged with two, or more, bits of information that identify which of a predetermined number of classes of image content characterize the image context in the neighborhood.

An example of a segmentation process that tags the image based on image content is disclosed in U.S. Pat. No. 6,549,658. The entire content of U.S. Pat. No. 6,549,658 is hereby incorporated by reference.

The tag information is carried through the image path in parallel with the image information proper and used to control the binary to contone conversion at the output. The tag information divides up the various types of image content so that the system can adequately cover the reconstruction of all images and still realize the appropriate image quality.

Figure 2:
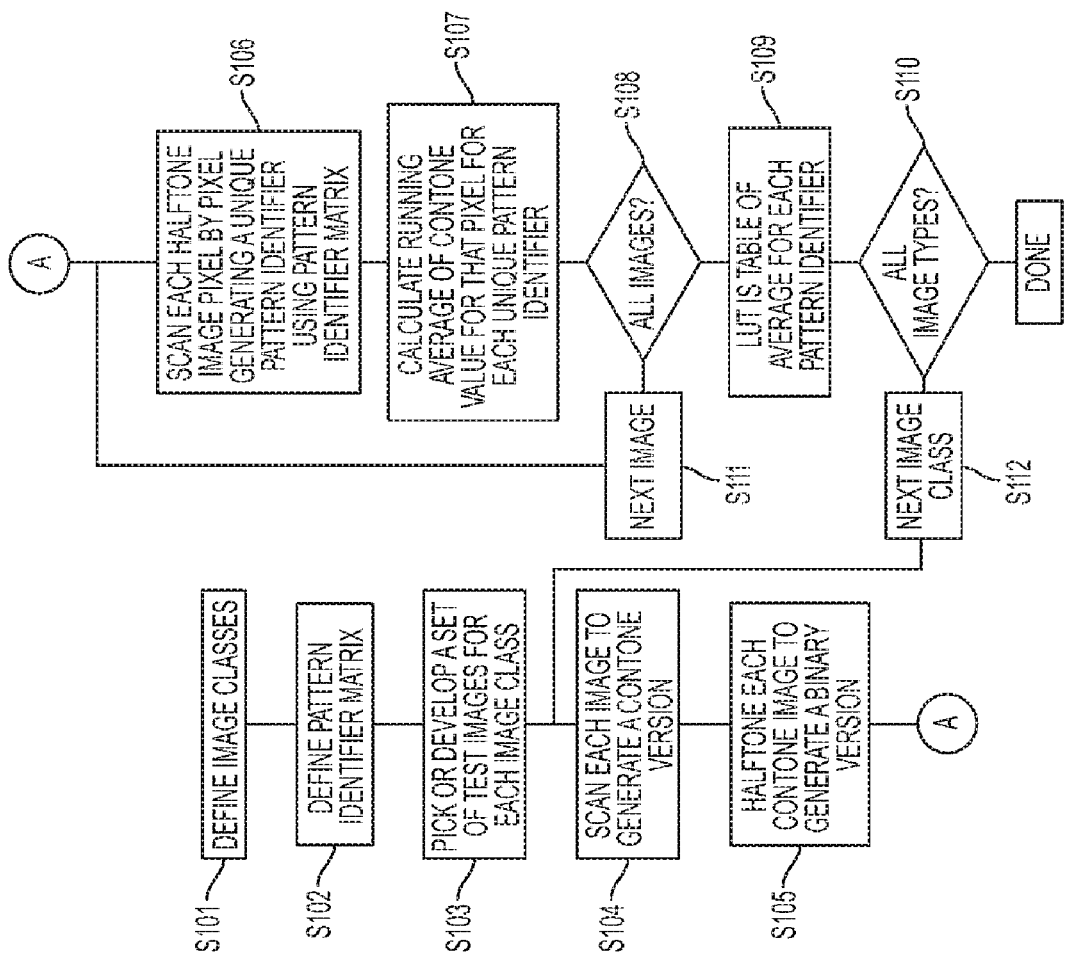
FIG. 2 shows a flowchart of the calibration process.

FIG. 2 shows a flowchart for creating the values for the look-up tables. As illustrated in FIG. 2, initially, classes of image content are defined at step S101.

At step S102, a pattern identification matrix is chosen. The pattern identification matrix is a small rectangular window around each pixel that is used to identify the pattern of pixels around the pixel of interest. In the following discussion, the height and width of the window are N and M, respectively.

For encoding, the size of the look-up table is $2^{N*M}$; i.e., a 4×4 pattern identification matrix window generates a look-up table that is 65536 elements long. For each image, a pattern kernel is centered on the pixel of interest and a pattern identifier is generated. The process of generating the pattern identifier will be described in more detail below.

For each image class, a large set of test documents is assembled at step S103. For each image class, the test document may be composed of portions of actual customer images and synthetically generated images that are representative of that kind of image content likely to be encountered. Each test document contains only image content from its class.

Thus, for example, a pictorial document class would include a variety of photographs, as well as images from high quality magazine reproduction where the halftone frequency is high; e.g., above 175 dpi; but not text or line art. A document class representing text and line art set would include a large variety of text in terms of fonts and sizes as well as non-Western character sets e.g. Japanese and Chinese. Similarly, a document class representing low frequency halftone documents would include samples from newspapers and similar kinds of documents.

In the next phase of the calibration process, at step S104, each of these test documents is scanned using a scanner. The output of this scan is the contone version of the document. This contone image is now further processed, at step S105, with a halftone. The result of the process of step S105 is a binary version of the same document image. Therefore, when completed, the calibration process generates two images per document: a contone image and a binary image.

Each halftone image is scanned, pixel by pixel, at step S106, and for each pixel, a pattern identifier is generated. The same process of generation is used during calibration and reconstruction. Each element of the pattern kernel is identified with a power of 2 starting with $2^0=1$ and going to $2^{(N*M-1)}$. There is no unique way of matching each element of the kernel with a power of 2; can be chosen at random; as long as the same matching is used for the calibration and reconstruction. However, it is easier to have some simple ordering of the matching, say from upper left to lower right going across the rows. FIG. 3 shows an example of a matching scheme for a 4×4 kernel 301. In each element of the kernel, the upper left hand number is a simple index into that element, while the lower right number is the power of 2 associated with the element. In this example, the weight of element of index i is given by $W_i=2^i$.

The pattern kernel is applied to each pixel in the binary image and a pattern identifier is generated by developing an N*M bit binary number where the 1s and 0s of the binary number are determined by the image pixel underlying the corresponding pattern kernel element.

For those elements of the kernel where the corresponding pixel in the binary image is a 1, a 1 is entered into the corresponding power of 2 in the binary representation of the pattern identifier, and where the pixel is 0; a 0 is entered into the identifier. That is the pattern identifier is generated according to the equation:

Identifier=$\Sigma w_i * p_i$

Where $w_i$ is the weight for the pattern kernel element, and $p_i$ is the corresponding image pixel value (0 or 1).

Figure 4:
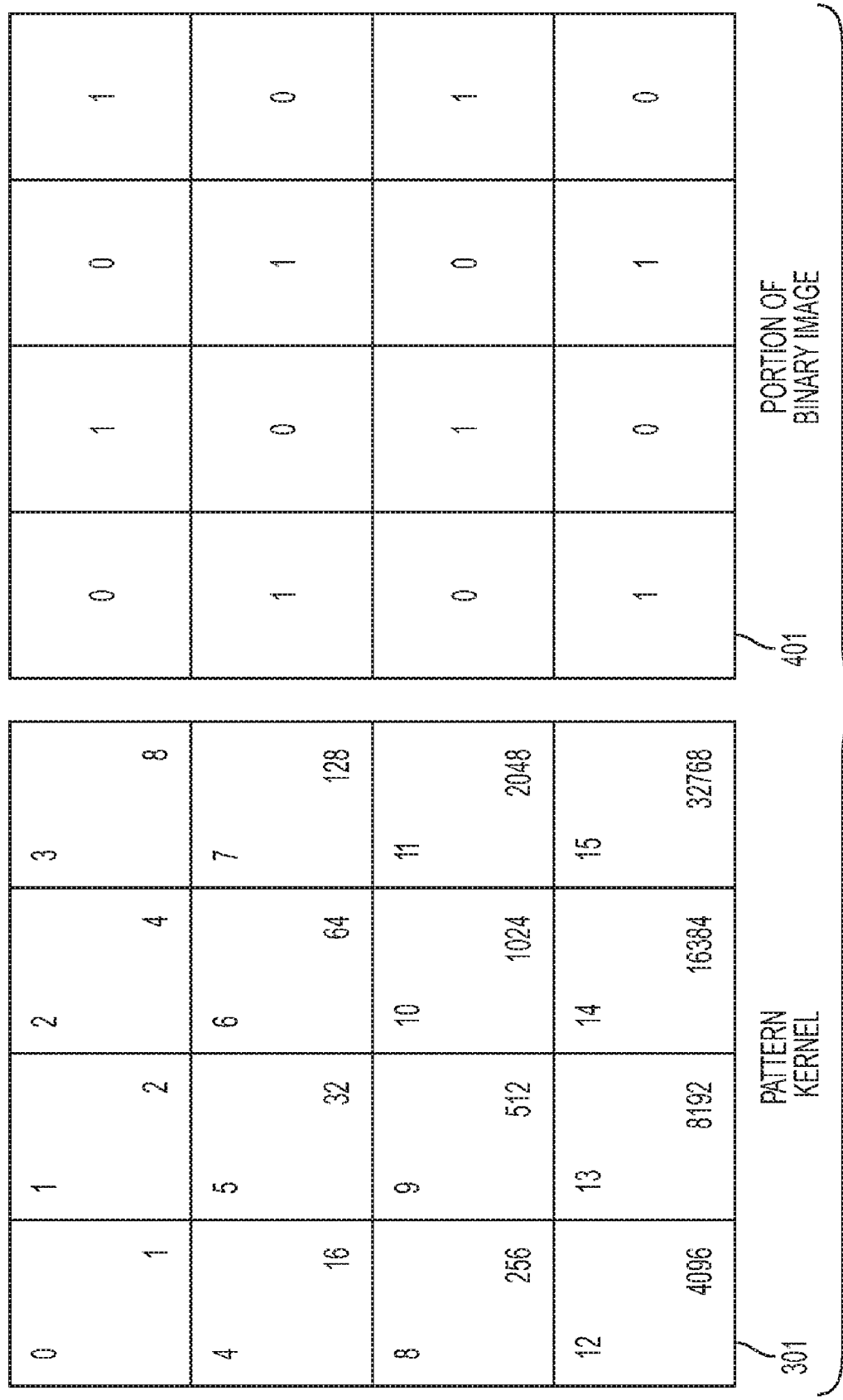
FIG. 4 shows how the 4×4 matrix from FIG. 3 is used to generate a unique pattern identifier.

FIG. 4 shows an example for a part of an image with the 4×4 kernel applied. Using the pattern kernel 301 and the image portion 401, the pattern identifier for this pattern is given by the binary number: 0101101001011010 or decimal 23130.

Using the pattern identifier, the value of the pixel in the contone image that corresponds to the pixel in the center of the pattern kernel is selected. Using this value, the calibration program keeps a running average value of the contone value for all the pixels with the same pattern identifier, at step S107. As noted above, for a 4×4 window, there are potentially 65536 different pattern identifiers.

The process continues for all images for this particular image content type, at steps S108 and S111. After all the test images for a particular class of image content have been processed in this way, a table of the average value of the contone pixels for each unique pattern identifier has been created. This average value will be the entry in the look-up table for the reconstruction process. The look-up table is simply a 65536 byte table whose entries are the average contone pixel value for each pattern identifier, at step S109.

The process is repeated for each class of image content, at steps S110 and S112. After the above calibration process has been carried out for each set of image content, a number of separate look-up tables generated are generated, one for each content type.

Figure 5:
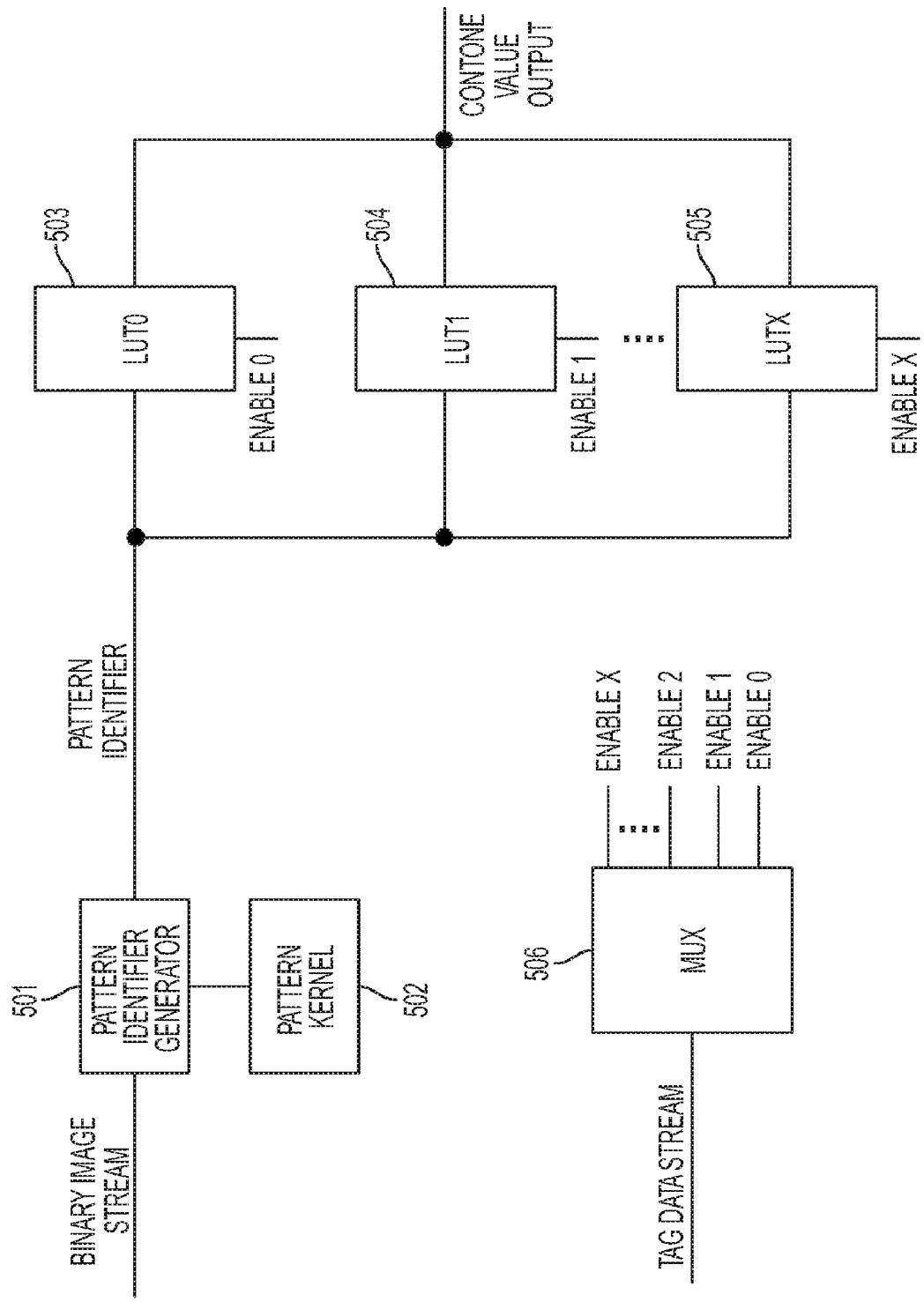
FIG. 5 shows a circuit that uses lookup tables generated during the calibration process to generate a reconstructed contone version of a tagged binary image.

As discussed above, each image pixel is input to the binary to contone reconstruction element of the image path along with its corresponding tag bits. The binary to contone element keeps a memory of a few scanlines and uses the scanlines to reconstruct, for each pixel, the pattern identifier using the same process as was used in the above-described calibration process. This pattern identifier is the address for the look-up tables, and the tag bits are used to choose which look-up table is actually used for generating the output. FIG. 5 shows schematically a system that carries out the binary to contone reconstruction.

In FIG. 5, the binary image data stream is input to a pattern identifier circuit 501 that computes the pattern identifier, using the pattern kernel 502. The output of the pattern identifier circuit 501 is an N*M bit number that is input to the look-up tables, 503, 504, and 505. These look-up tables can be implemented as simple memory chips or equivalent circuit elements, or the look-up tables may be part of a larger ASIC or similar complex programmable device. The look-up tables may be hard coded, permanently programmed for example as ROM memory, or the look-up tables may be programmable to allow for changes.

The tag data stream, suitably delayed to account for any delays in computing the pattern identifier, is input to a multiplexer 506. The multiplexer 506 accepts the tag data input and activates the one of its outputs that corresponds to the binary number represented by the tag. These outputs are each connected to the output enable control of one of the look-up tables, 503, 504, and 505. Thus, the look-up table that has been loaded with the contone value that corresponds to the pattern for the image type is enabled and its value is output where it is used to modulate the output printing mechanism.

In summary, the contone restoration processes, described above, control the behavior (from a feature/function sense) of the image path. For example, the contone restoration processes, described above, may control the behavior of the image path so as to make the image look darker. On the other hand, for example, the contone restoration processes, described above, may control the behavior of the image path so as to make the image look sharper.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system to generate a continuous tone image from tagged binary encoded image, comprising:
    a pattern identifier generator to generate a pattern identifier value based upon a pattern of pixels around a pixel of interest;
    an image type selector to generate an image type signal identifying an image context type in a pre-determined neighborhood of pixels around a pixel of interest; and
    a contone value generator, operatively connected to said pattern identifier generator and said image type selector to receive said pattern identifier value and said image type signal, to generate a contone value from the received pattern identifier value based upon the received image type signal.

2. The system as claimed in claim 1, wherein said contone value generator includes a plurality of look-up tables, each look-up table having a plurality of contone values stored therein, each contone value corresponding to a pattern identifier value, each look-up table corresponding to an image context type.

3. The system as claimed in claim 2, wherein said image type signal enables a look-up table associated with the image context type corresponding to the received image type signal.

4. The system as claimed in claim 1, wherein said contone value generator includes a memory having a plurality of contone values stored therein, each combination of a pattern identifier value and an image context type being mapped to a stored contone value.

5. The system as claimed in claim 1, wherein said contone value generator includes a logic circuit to generate a plurality of contone values, the generated contone value corresponding to a pattern identifier value and an image context type.

6. A method to generate a continuous tone image from tagged binary encoded image, comprising:

electronically generating, using an electronic device, a pattern identifier value based upon a pattern of pixels around a pixel of interest;

electronically generating, using an electronic device, an image type signal identifying an image context type in a pre-determined neighborhood of pixels around a pixel of interest; and electronically generating, using an electronic device, in response to receiving said pattern identifier value and said image type signal, a contone value from the received pattern identifier value based upon the received image type signal.

* * * * *